UNITED STATES PATENT OFFICE.

EMILE MAERTENS, OF PROVIDENCE, RHODE ISLAND.

PROCESS OF DEGREASING WOOL.

SPECIFICATION forming part of Letters Patent No. 698,209, dated April 22, 1902.

Application filed March 1, 1901. Serial No. 49,493. (No specimens.)

*To all whom it may concern:*

Be it known that I, EMILE MAERTENS, a citizen of the United States, residing at Providence, in the county of Providence and State of Rhode Island, have invented new and useful Improvements in the Art of Cleaning Wool with Volatile Solvents, of which the following is a specification.

This invention relates more specifically to the use of various aqueous saline or acid solutions, or of both together, in the process of degreasing wool or other animal fibers with a volatile fat-solvent (such as naphtha) for the purpose of preventing or correcting the emulsification of the volatile fat-solvent used in the degreasing operation while the wool (or other animal fiber) is being freed from the volatile fat-solvent or from its residue by means of water or aqueous solutions prior to its removal from the digester.

The application of the present process relates more particularly to wools (or other animal fibers) which still contain natural soaps or potash compounds after their extraction with volatile fat-solvent and is intended to transform or decompose the soaps or potash compounds present on the fiber, (by such agents as shall not cause the precipitation on the fiber of insoluble soaps or of substances insoluble in either a volatile fat-solvent or in aqueous soapy and alkaline solutions,) and thus prevent or correct the emulsification of the volatile fat-solvent therewith and with the water or aqueous solution used for its removal from the fiber.

The operation is carried on in apparatus such as described in United States Patents Nos. 630,293, 630,294, 630,295, 630,296, 654,529, 654,530, 660,757, and 660,758, the essential difference between the processes described therein and the present process consisting in the use, in lieu of water or aqueous solutions of potash salts, of aqueous solutions of suitable salts or acids, or of both together, for removing from the wool the volatile fat-solvent or the residue of the volatile fat-solvent used in the degreasing operation, also in the use of water or of alkaline solutions, or of both, for the elimination or neutralization of any acidity existing on the fiber after the removal of the residual solvent therefrom by the acid or saline solution mentioned, and also in the use of a volatile fat-solvent or of aqueous alkaline or soapy solutions for the subsequent removal of the fatty matters or compounds precipitated on the fiber by the decomposition of the natural soaps by the acid or saline solution referred to.

A solution of any chemical agent which will transform or decompose the natural soaps without forming on the fiber a compound insoluble in a volatile fat-solvent or in alkaline and soapy solutions is available for the purpose mentioned; but for reasons of economy and convenience I prefer to use aqueous solutions of chlorid of sodium, of sulfuric acid, or of sulfuric acid and chlorid of sodium of sufficient strength or concentration to accomplish the transformation or decomposition of the soaps present and which will vary according to the nature and condition of the material under treatment and which in practice may vary from 1° to 25° Baumé, according to the composition of the solution used.

After the wool or other animal fiber has been extracted with a volatile fat-solvent in the usual manner and preferably after the bulk of the residual solvent has been expressed therefrom in any suitable manner the soap transforming or decomposing solution is passed through the wool, and the residual solvent is removed thereby on account of the difference in its specific gravity and that of the solution used for its removal and of its immiscibility therewith. If desired, the bulk of the residual solvent and of the potash salts present can first be removed by passing water or a solution of potash salts through the wool, and after the removal of the bulk of these liquids from the wool and preferably after the expression of the bulk of their residue from the wool the soap transforming or decomposing solution is passed therethrough. After the bulk of the saline, acid, or acid saline solution has been removed from the wool and when the last traces of the solvent have been removed from it also the wool is rinsed with water for the removal of the acid or saline solution which it still contains, or it may be neutralized by passing through it a solution of an alkali or alkaline carbonate. After the wool has been sufficiently rinsed or neutralized and if it then contains any fatty acids or fatty matters these are removed by treating the wool with an aqueous alkaline or soapy solution which will saponify or emulsify them and remove them from the fiber.

If desirable, the neutralizing of acids other than fatty acids and the emulsification or saponification of the latter can be done at one operation by having the treating solution sufficiently alkaline to neutralize all the acid present and to saponify or emulsify all the fat present also.

The neutralization of the wool and the removal therefrom of the fat resulting from the decomposition of the natural soaps by the removal of the residual solvent with an acid solution can be accomplished in the digester itself, or in the open in an ordinary wool-scouring machine, or the neutralizing can be done in the digester and the removal of the residual fat may be done in the open.

In lieu of removing the residual fat from the wool or other animal fiber with an aqueous alkaline or soapy solution the latter may be removed by a volatile fat-solvent in the usual manner after the bulk of the residual aqueous soap-decomposing solution has been removed from the wool. The residual solvent is then removed from the wool, which is then rinsed or neutralized, or both, for the removal of the salt or acid from the wool or other animal fiber being treated.

Having described my invention, what I claim is—

1. In the art of cleaning wool, the process which consists in extracting the wool-fat by volatile solvent, then treating the wool with an aqueous solution of an agent which will transform or decompose the potash soaps of the wool, then subjecting the wool to the action of an agent to remove the transformed soaps, chemicals or fatty acids set free by the decomposition of the potash soaps, substantially as described.

2. In the art of cleaning wool, the process which consists in extracting the wool-fat by volatile solvent, then removing the bulk of the solvent, then treating the wool with an aqueous solution of an agent which will transform or decompose the potash soaps of the wool, then subjecting the wool to the action of an agent to remove the transformed soaps, chemicals or fatty acids set free by the decomposition of the potash, soaps, substantially as described.

3. In the art of cleaning wool, the process which consists in extracting the wool-fat by volatile solvent, then treating the wool with an aqueous solution of an agent which will transform or decompose the potash soaps of the wool, then removing the bulk of the solution from the wool, then subjecting the wool to the action of an agent to remove the transformed soaps, chemicals or fatty acids set free by the decomposition of the potash soaps, substantially as described.

4. In the art of cleaning wool, the process which consists in extracting the wool-fat by volatile solvent, then treating the wool with an aqueous solution of an agent which will transform or decompose the potash soaps of the wool, then removing the bulk of the solution from the wool, then removing the last traces of solvent from the wool, then subjecting the wool to the action of an agent to remove the transformed soaps, chemicals or fatty acids set free by the decomposition of the potash soaps, substantially as described.

5. In the art of cleaning wool, the process which consists in extracting the wool-fat by volatile solvent, then removing the bulk of the solvent, then treating the wool with an aqueous solution of an agent which will transform or decompose the potash soaps of the wool, then removing the bulk of the solution from the wool, then removing the last traces of solvent from the wool, then subjecting the wool to the action of an agent to remove the transformed soaps, chemicals or fatty acids set free by the decomposition of the potash soaps, substantially as described.

6. In the art of cleaning wool, the process which consists in extracting the wool-fat by volatile solvent, then removing the residual solvent and the bulk of the potash compounds with water or other suitable aqueous solution which will not decompose the potash soaps, then treating the wool with an aqueous solution of an agent which will transform or decompose the residual potash compounds, then removing the last traces of solvent, then removing the transformed soaps, chemicals or precipitated fatty acids from the wool, substantially as described.

7. In the art of cleaning wool, the process which consists in extracting the wool-fat by volatile solvent, then removing the bulk of the solvent, then removing the residual solvent and the bulk of the potash compounds with water or other suitable aqueous solution which will not decompose the potash soaps, then treating the wool with an aqueous solution of an agent which will transform or decompose the residual potash compounds, then removing the last traces of solvent from the wool, then removing the transformed soaps, chemicals or precipitated fatty acids from the wool, substantially as described.

8. In the art of cleaning wool, the process which consists in extracting the wool-fat by volatile solvent, then removing the residual solvent and the bulk of the potash compounds with water or other suitable aqueous solution which will not decompose the potash soaps, then removing the bulk of the solution from the wool, then treating the wool with an aqueous solution of an agent which will transform or decompose the residual potash compounds, then removing the last traces of solvent from the wool, then removing the transformed soaps, chemicals or precipitated fatty acids from the wool, substantially as described.

9. In the art of cleaning wool, the process which consists in extracting the wool-fat by volatile solvents, then removing the bulk of the solvent, then removing the residual solvent and the bulk of the potash compounds with water or other suitable aqueous solution which will not decompose the potash soaps, then removing the bulk of this solution from the wool, then treating the wool with an aqueous solution of an agent which will transform or decompose the residual potash compounds, then removing the last traces of solvent from the wool, then removing the transformed soaps, chemicals or precipitated fatty acids from the wool, substantially as described.

10. In the art of cleaning wool, the process which consists in extracting the wool-fat by volatile solvent, then removing the solvent and simultaneously transforming or decomposing the potash compounds on the wool, then removing from the wool the products resulting from this transformation or decomposition, substantially as described.

11. In the art of cleaning wool, the process which consists in extracting the wool-fat by volatile solvent, then removing the solvent and simultaneously transforming or decomposing the potash compounds on the wool, then removing the last traces of solvent from the wool, then removing from the wool the products from the transformation or decomposition of the potash compounds, substantially as described.

12. In the art of cleaning wool, the process which consists in extracting the wool-fat by volatile solvent, then removing the solvent by an agent which will decompose the soaps present on the wool, then treating the wool with a volatile fat-solvent to remove the fatty acids therefrom, substantially as described.

13. In the art of cleaning wool, the process which consists in extracting the wool-fat by volatile solvent, then removing the solvent by an agent which will decompose the potash soaps present on the wool, then removing the bulk of the decomposing agent, then treating the wool with a volatile fat-solvent to remove the fatty acids therefrom, substantially as described.

14. In the art of cleaning wool, the process which consists in extracting the wool-fat by volatile solvent, then removing the solvent by an agent which will decompose the soaps present on the wool, then treating the wool with a volatile fat-solvent to remove the fatty acids therefrom, then removing this latter solvent, substantially as described.

15. In the art of cleaning wool, the process which consists in extracting the wool-fat by volatile solvent, then removing the bulk of the solvent from the wool, then treating the wool with an aqueous solution of an agent to decompose the potash soaps present on the wool, then removing the fatty acids by a volatile fat-solvent, substantially as described.

16. In the art of cleaning wool, the process which consists in extracting the wool-fat by volatile solvent, then removing the bulk of the solvent from the wool, then treating the wool with an aqueous solution of an agent to decompose the potash soaps present on the wool, then removing the bulk of the decomposing solution, then removing the fatty acids by a volatile solvent, substantially as described.

17. In the art of cleaning wool, the process which consists in extracting the wool-fat by volatile solvent, then removing the bulk of the solvent from the wool, then treating the wool with an aqueous solution of an agent to decompose the potash soaps present on the wool, then removing the fatty acids by a volatile fat-solvent, then removing the latter solvent from the wool, then neutralizing or rinsing the wool or both, substantially as described.

18. In the art of cleaning wool, the process which consists in extracting the wool-fat by volatile solvent, then removing the bulk of the solvent from the wool, then treating the wool with an aqueous solution of an agent to decompose the potash soaps present on the wool, then removing the bulk of the decomposing solution, then removing the fatty acids by a volatile fat-solvent, then removing the latter solvent from the wool, then neutralizing or rinsing the wool or both, and then washing the wool.

In testimony whereof I affix my signature in presence of two witnesses.

EMILE MAERTENS.

Witnesses:
RUFUS S. MATTESON,
MABEL I. FAY.